United States Patent
Ryu et al.

(10) Patent No.: US 8,780,810 B2
(45) Date of Patent: Jul. 15, 2014

(54) METHOD AND APPARATUS FOR PERFORMING RANDOM ACCESS WITH EXTENDED ACCESS BARRING

(75) Inventors: Ki Seon Ryu, Anyang-si (KR); Sang Gook Kim, San Diego, CA (US); Ki Dong Lee, San Diego, CA (US)

(73) Assignee: LG Electronics Inc., Seoul (KR)

(*) Notice: Subject to any disclaimer, the term of this patent is extended or adjusted under 35 U.S.C. 154(b) by 101 days.

(21) Appl. No.: 13/598,255

(22) Filed: Aug. 29, 2012

(65) Prior Publication Data

US 2013/0051325 A1 Feb. 28, 2013

Related U.S. Application Data

(60) Provisional application No. 61/529,181, filed on Aug. 30, 2011.

(30) Foreign Application Priority Data

Aug. 21, 2012 (WO) ................ PCT/KR2012/006629

(51) Int. Cl.
  *H04W 80/04* (2009.01)
  *H04W 74/08* (2009.01)
(52) U.S. Cl.
  CPC ................................ *H04W 74/0833* (2013.01)
  USPC ............................. 370/328; 370/335; 370/342
(58) Field of Classification Search
  CPC ............... H04B 7/2628; H04B 7/2463; H04B 2201/70701; H04B 7/2621; H04J 2011/0003
  USPC .......................... 370/328, 335, 337, 342, 344
  See application file for complete search history.

(56) References Cited

U.S. PATENT DOCUMENTS

| 2011/0170503 A1* | 7/2011 | Chun et al. ..................... 370/329 |
| 2013/0040597 A1* | 2/2013 | Jang et al. .................. 455/404.1 |
| 2013/0040605 A1* | 2/2013 | Zhang et al. .................. 455/411 |
| 2013/0044702 A1* | 2/2013 | Jayaraman et al. ........... 370/329 |
| 2013/0122906 A1* | 5/2013 | Klatt .......................... 455/435.1 |

OTHER PUBLICATIONS

3GPP, "Technical Specification Group Services and Systems Aspects; Service accessibility (Release 11)", 3GPP TS 22.011 V11.0.0, Jun. 2011, pp. 1-26.
3GPP, "Technical Specification Group Services and Systems Aspects; Service requirements for Machine-Type Communications (MTC); Stage 1 (Release 11)", 3GPP TS 22.368 V11.2.0, Jun. 2011, pp. 1-25.
3GPP, "Technical Specification Group Services and Systems Aspects; System Improvements for Machine-Type Communications; (Release 10)", 3GPP TR 23.888 V1.0.0, Jul. 2010, pp. 1-80.

* cited by examiner

*Primary Examiner* — Xavier Szewai Wong
*Assistant Examiner* — Natalin Pascual Peguero
(74) *Attorney, Agent, or Firm* — Birch, Stewart, Kolasch & Birch, LLP (57) ABSTRACT

A method and apparatus for extended access barring (EAB) in a wireless communication system. In the proposed method, EAB application information is defined. Further, a base station is configured to send random access (RA) response within RA response window if it receives any random access preamble, so RA response window should be set as the minimum time duration UE should check the existence of RA response. In the proposed method, the UE configured with EAB should wait the duration of RA response window to receive RA response before skipping initial EAB checking. If RA response window passed and no RA response received, UE skips EAB checking in case of initial random access preamble transmission.

5 Claims, 7 Drawing Sheets

METHOD AND APPARATUS FOR PERFORMING RANDOM ACCESS WITH EXTENDED ACCESS BARRING

CROSS-REFERENCE TO RELATED APPLICATIONS

The present application for patent claims priority to Provisional Application No. 61/529,181 filed on Aug. 30, 2011, and International Application No. PCT/KR2012/006629 filed on Aug. 21, 2012, which are incorporated herein by reference.

BACKGROUND OF THE INVENTION

1. Field of the Invention

The technical features of this document relate to machine type communication (MTC) in wireless communications using a number of orthogonal frequency division multiple (OFDM) symbols, and more particularly, to a method and apparatus for performing random access procedure with extended access barring.

2. Related Art

The Third Generation Partnership Project (3GPP) Long Term Evolution (LTE) which is a set of enhancements to the Universal Mobile Telecommunications System (UMTS) is introduced as 3GPP Release 8. The 3GPP LTE uses orthogonal frequency division multiple access (OFDMA) for a downlink, and uses single carrier frequency division multiple access (SC-FDMA) for an uplink, and adopts multiple input multiple output (MIMO) with up to four antennas. In recent years, there is an ongoing discussion on 3GPP LTE-Advanced (LTE-A), which is a major enhancement to the 3GPP LTE.

Machine to machine (M2M) communication or machine-type communication (MTC) is the communication between machines that do not necessarily need human intervention. The 3GPP has started an effort to determine potential network optimizations that could lower the operational costs associated with offering these new M2M services.

SUMMARY OF THE INVENTION

A method and apparatus receiving data associated with extended access barring (EAB) in a wireless communication system are provided. The method is performed by an MTC device which can be a terminal having MTC features.

In one aspect, the method comprises initiating a random access procedure by determining whether a random access response is received from a base station (BS), before transmitting a random access preamble from the UE, during a random access response window; when the random access response is not received during the random access response window, transmitting a random access preamble to the BS; when the random access response is received during the random access response window, determining UE whether EAB application information included in the random access response indicates that the EAB is applied; when the EAB application information indicates that the EAB is applied, receiving EAB information from the BS to perform a subsequent random access procedure, wherein a subsequent random access procedure is performed based on the EAB information; and when the EAB application information does not indicate that the EAB is applied, transmitting a random access preamble to the BS.

In the method, the subsequent random access procedure comprises: when the UE is not barred based on the received EAB information, transmitting a random access preamble to the UE.

In the method, the EAB application information is 1-bit information indicating whether at least one of access classes 0 to 9 is barred, and wherein the 1-bit information is set on when the at least one access class is barred.

In the method, the EAB information includes bitmap information indicating whether a certain access class is barred or not In the method, the bitmap information consists of 10 bits corresponding to access classes 0 to 10

In the method, the EAB information is received by the UE via a system information block.

The method further comprises receiving system information indicating a size of the random access response window.

In the method, the UE is a machine type communication (MTC) device.

In another aspect, the method comprises: initiating a random access procedure by determining whether a random access response is received from a base station (BS), before transmitting a random access preamble from the UE, during a random access response window; when the random access response is not received during the random access response window, transmitting a random access preamble to the BS; when the random access response is received during the random access response window, determining whether EAB application information included in the random access response indicates that the EAB is applied; when the EAB application information indicates that the EAB is applied, transmitting an radio resource control (RRC) connection request message to the BS; and when the EAB application information does not indicate that the EAB is applied, transmitting a random access preamble to the BS.

DESCRIPTION OF EXEMPLARY EMBODIMENTS

The technology described below can be used in various wireless communication systems such as code division multiple access (CDMA), frequency division Multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. The UTRA is a part of a universal mobile telecommunication system (UMTS).

The 3$^{rd}$ generation partnership project (3GPP) long term evolution (LIE) is a part of an evolved UMTS (E-UMTS) using the E-UTRA. The 3GPP LTE uses the OFDMA in the downlink and uses the SC-FDMA in the uplink.

For clarity of explanation, the following description will focus on the 3GPP LTE and its evolution. However, the technical features of this description are not limited thereto.

Figure 1:
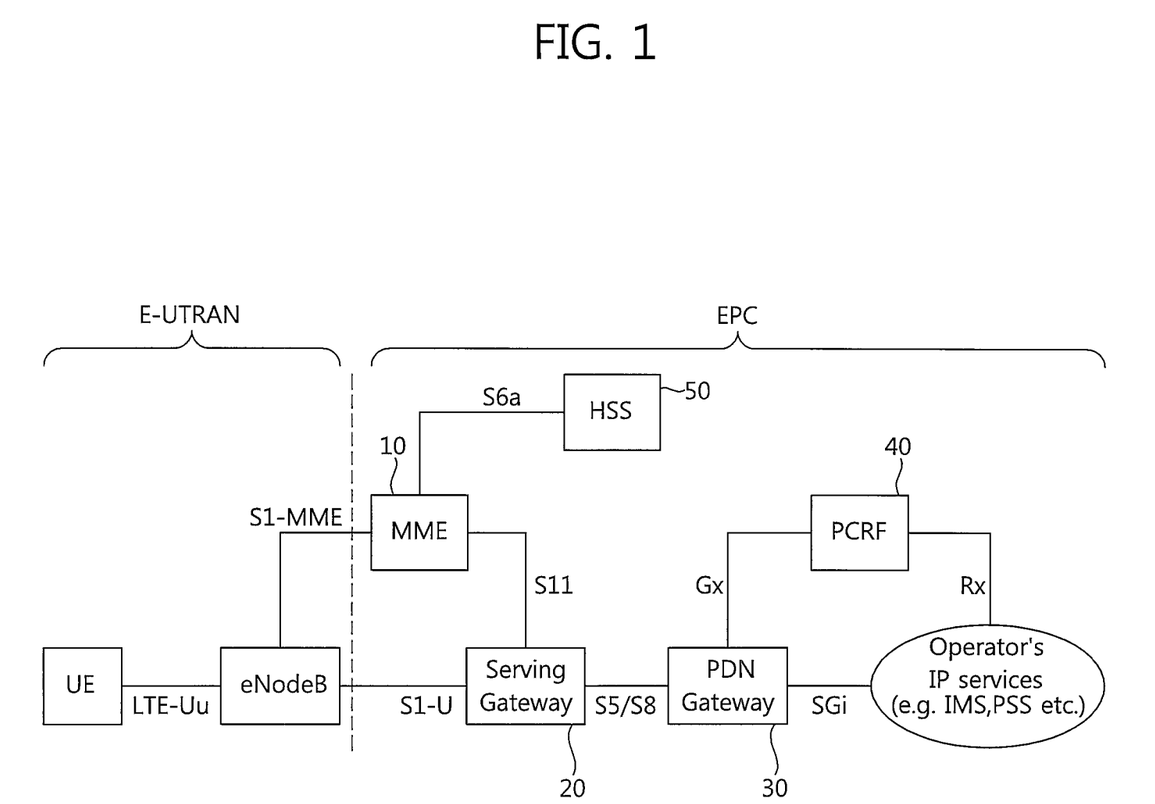
FIG. 1 is a view illustrating an Evolved Packet System which is associated with the Long Term Evolution (LTE) system.

FIG. 1 is a view illustrating an Evolved Packet System which is associated with the Long Term Evolution (LTE) system. The LTE system aims to provide seamless Internet Protocol (IP) connectivity between a user equipment (UE) and a pack data network (PDN), without any disruption to the end user's application during mobility. While the LTE system encompasses the evolution of the radio access through an E-UTRAN (Evolved Universal Terrestrial Radio Access Network) which defines a radio protocol architecture between a user equipment and a base station, it is accompanied by an evolution of the non-radio aspects under the term 'System Architecture Evolution' (SAE) which includes an Evolved Packet Core (EPC) network. The LTE and SAE comprise the Evolved Packet System (EPS).

The EPS uses the concept of 'EPS bearers' to route IP traffic from a gateway in the PDN to the UE. A bearer is an IP packet flow with a specific Quality of Service (QoS) between the gateway and the UE. The E-UTRAN and EPC together set up and release the bearers as required by applications.

The EPC, which is also referred to as the core network (CN), controls the UE and manages establishment of the bearers. As depicted in FIG. 1, the node (logical or physical) of the EPC in the SAE includes a Mobility Management Entity (MME) 10, a PDN gateway (PDN-GW or P-GW) 30, a Serving Gateway (S-GW) 20, a Policy and Charging Rules Function (PCRF) 40, a Home subscriber Server (HSS) 50, etc.

The MME 10 is the control node which processes the signaling between the UE and the CN. The protocols running between the UE and the CN are known as the Non-Access Stratum (NAS) protocols. Examples of functions supported by the MME 10 includes functions related to bearer management, which includes the establishment, maintenance and release of the bearers and is handled by the session management layer in the NAS protocol, and functions related to connection management, which includes the establishment of the connection and security between the network and UE, and is handled by the connection or mobility management layer in the NAS protocol layer.

The S-GW 20 serves as the local mobility anchor for the data bearers when the UE moves between eNodeBs. All user IP packets are transferred through the S-GW 20. The S-GW 20 also retains information about the bearers when the UE is in idle state (known as ECM-IDLE) and temporarily buffers downlink data while the MME initiates paging of the UE to re-establish the bearers. Further, it also serves as the mobility anchor for inter-working with other 3GPP technologies such as GPRS (General Packet Radio Service) and UMTS (Universal Mobile Telecommunications System).

The P-GW 30 serves to perform IP address allocation for the UE, as well as QoS enforcement and flow-based charging according to rules from the PCRF 40. The P-GW 30 performs QoS enforcement for Guaranteed Bit Rate (GBR) bearers. It also serves as the mobility anchor for inter-working with non-3GPP technologies such as CDMA2000 and WiMAX networks.

The PCRF 40 serves to perform policy control decision-making, as well as for controlling the flow-based charging functionalities.

The HSS 50, which is also referred to as a Home Location Register (HLR), contains users' SAE subscription data such as the EPS-subscribed QoS profile and any access restrictions for roaming. Further, it also holds information about the PDNs to which the user can connect. This can be in the form of an Access Point Name (APN), which is a label according to DNS (Domain Name system) naming conventions describing the access point to the PDN, or a PDN Address which indicates subscribed IP addresses.

Between the EPS network elements shown in FIG. 1, various interfaces such as an S1-U, S1-MME, S5/S8, S11, S6a, Gx, Rx and SGi are defined.

Figure 2:
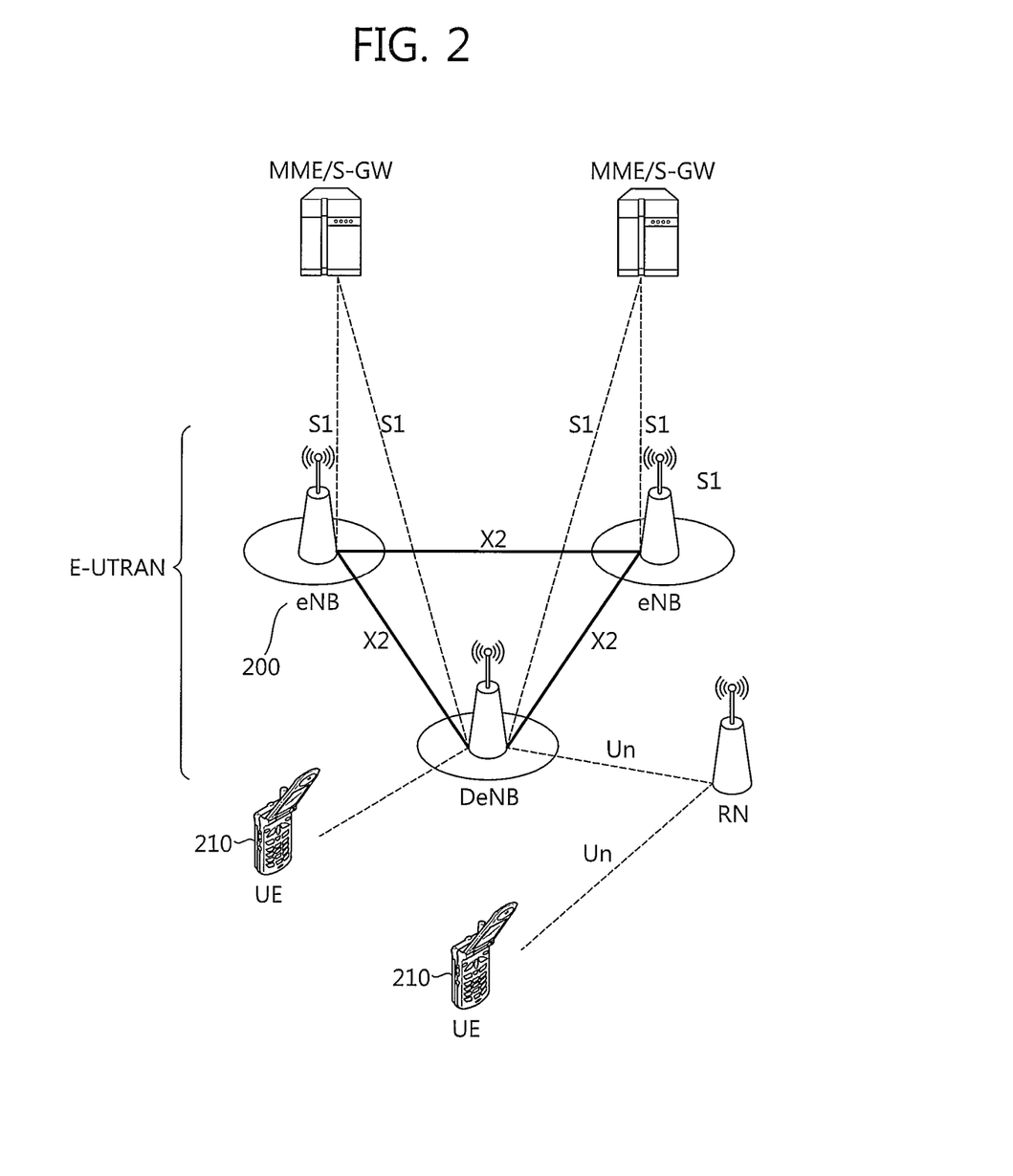
FIG. 2 is a view illustrating an overall architecture of the E-UTRAN to which the following technical features are applied.

FIG. 2 is a view illustrating an overall architecture of the E-UTRAN to which the following technical features are applied.

The E-UTRAN includes at least one eNB (evolved-Node B) 200 providing a user plane and a control plane towards a user equipment (UE) 210. The UE can be fixed or mobile and can be referred to as another terminology, such as a MS (Mobile Station), a UT (User Terminal), an SS (Subscriber Station), an MT (mobile terminal), a wireless device, or the like. The eNB 200 may be a fixed station that communicates with the UE 100 and can be referred to as another terminology, such as a base station (BS), a NB (NodeB), a BTS (Base Transceiver System), an access point, or the like.

The protocols running between the eNBs 200 and the UE 210 are known as the Access Stratum (AS) protocols.

The BSs (or eNBs) 200 are interconnected with each other by means of an X2 interface. The BSs 200 are also connected by means of the S1 interface to the aforementioned EPC (Evolved Packet Core) elements, more specifically to the Mobility Management Entity (MME) by means of the S1-MME and to the Serving Gateway (S-GW) by means of the S1-U.

Further, the E-UTRAN can additionally provide relay functionality. The E-UTRAN can include a Donor eNB (DeNB) that provides at least one Relay Node (RN), with access to the core network. Between the DeNB and RN, an Un interface is defined, whereas an Uu interface is further defined between the RN and the UE.

Here, features related to machine-type communication (MTC) are further explained. As discussed above, MTC is the communication between machines that do not necessarily need human intervention, and the 3GPP has started an effort to determine potential network optimizations. The MTC, which is also referred to as machine-to-machine (M2M), is expected to have applications in areas, such as smart metering, home automation, e-Health, fleet management, etc. In 3GPP LTE, the support of MTC (or M2M) nodes, or interchangeably delay-tolerant access or low priority access, requires very efficient operating mechanisms and protocols for the traffic channel and random access channel.

MTC has a number of unique characteristics which may be used to optimize the usage of the operator network. These characteristics include, for example: mostly data-centric communication (voice not expected), a potentially large number of communicating terminals, a low traffic volume per terminal, a potentially low mobility for some devices, and potentially power-limited devices.

Hereinafter, the random access procedure is explained. The random access procedure can be initiated with an Access Class (AC) barring, which is also referred to as AC barring, ACB, or Rel-10 ACB. In 3GPP, each UE belongs to an AC in the range 0-9. In addition, some UEs may belong to one or more high priority ACs in the range 11-15, which are reserved for specific uses, e.g., security services, public utilities, PLMN staff, etc. AC 10 is used for emergency access.

The UE checks if access is barred for all its applicable ACs, and relevant control information is transmitted via SystemInformationBlockType2 (SIB2). SIB2 may include a set of AC barring parameter for Mobile Originated (MO) calls and/or MO signaling. This set of parameters comprises a probability factor and a barring timer for ACs 0-9 and a list of barring bits for ACs 11-15. For ACs 0-9, if the UE initiates an MO call and the relevant parameters are included, the UE draws a random number. If the drawn number exceeds the probability factor, access is not barred. Otherwise access is barred for a duration which is randomly selected based on the broadcasted barring timer value. For ACs 11-15, if the UE initiates an MO call and the relevant AC barring parameters are included, access is barred whenever the bit corresponding to all of the UE's AC is set. The behavior is similar in the case of UE-initiated MO signaling.

Figure 3:
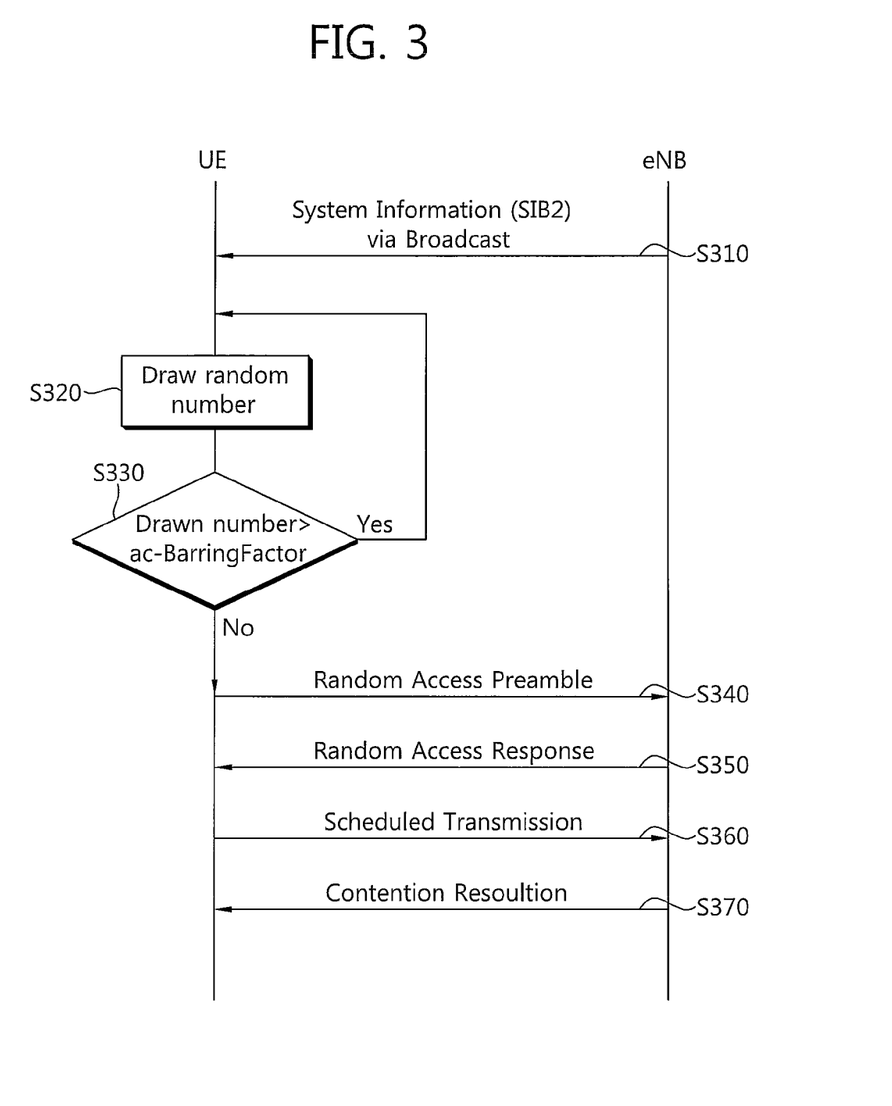
FIG. 3 is a flow diagram showing a random access procedure which is used for an embodiment of the proposed method.

FIG. 3 is a flow diagram showing a random access procedure which is used for an embodiment of the proposed method.

In order to obtain new connection (e.g., a data connection or signaling connection) UEs should first perform a RA procedure and this is a common feature in most cellular system. Further, the RA procedure can be categorized into contention-based and contention-free. The example depicted in FIG. 3 is directed to the contention-based RA procedure.

In step S310, the relevant parameters are transmitted from a base station (e.g., eNB). Various control information can be broadcasted via 'System information', such as Master Information Block (MIB) and System Information Block type k (k=1, 2, . . . ), and the relevant parameters associated with the AC barring are broadcasted via SIB2, as discussed above. As explained above, SIB2 provides information for UEs how they perform the RA procedure. The SIB2 further includes a value for 'ac-BarringFactor', which indicates the probability that a certain UE is supposed to be prevented from attempting the RA procedure to a certain cell. In case of an ordinary call (i.e., MO data call), in step S320, the UE shall draw a random number from a uniform distribution (0,1). If the random number drawn is less than the 'ac-BarringFactor', the UE performs subsequent steps of the RA procedure (S330).

In step S340, a UE selects a particular random access preamble and certain Random Access Channel (RACH) resources from an available random access preamble set and RACH resources, and transmits the selected random access preamble on the selected RACH to an eNB.

In step S350, the eNB receives the random access preamble, and then transmits a random access response to the UE. Further, the random access response includes a time advance (TA) and uplink radio resource allocation information for the transfer of a scheduled message, and also includes an index of the received random access response so that the UE can determine whether the random access response is for the UE. The random access response transmitted on a DL-SCH (downlink-shared channel) may be specified by a DL L1/L2 (downlink layer 1/layer 2) control channel indicated by a random access-radio network temporary identity (RA-RNTI).

In step S360, the UE receives the random access response, and then transmits the scheduled message according to radio resource allocation information included in the random access response. The scheduled message, which is also referred to as a message 3, may include a radio resource control (RRC) connection request message.

In step S370, the BS receives the scheduled message from the UE, and then transmits a contention resolution message, which is also referred to as a message 4, to the UE. In order to check whether contention occurs with respect to the message 3, a contention resolution timer is initiated after transmitting the message 3. If the message 4 is not successfully received until the contention resolution timer expires, step 370 may be repeated based on predefined configuration.

After the RRC connection request message (S360) is received by the network, an RRC connection can be successfully established and the UE enters an RRC connected mode. However, the RRC connection request may be rejected, and the UE may thereafter receive an 'RRCConnectionReject' message from the eNB. Further, the UE may consider that the RRC connection requested is regarded as rejected without explicitly receiving the 'RRCConnectionReject' when the contention resolution timer expires without receiving the message 4. In these cases, a certain delay, which is referred to as 'wait time' in 3GPP context, can be applied before performing the AC barring to avoid the large number of UE-initiated call attempts. In particular, the UE is required to avoid a subsequent AC barring during the wait time, which is indicated by the network. In the standard, a range of the wait time is set to [1, 16 (sec)].

In addition, if an 'RRCConnectionRelease' message is received by a UE, the wait time is also applied before performing the AC barring. The RRCConnectionRelease message is received when the RRC Connection is released after the RRC connection is successfully established.

Recently, 3GPP has newly introduced an 'extendedWaitTime', which is an extended version of the above-mentioned wait time. Accordingly, the extended wait time is applicable to a case where a request for RRC connection is regarded as rejected or an RRC connection is released. Meanwhile, the extended wait time can be additionally used with the wait time. Namely, for a certain UE, both the wait time and the extended wait time can be applied.

A range of the extended wait time was originally set to [1, 4096 (sec)], but recently changed to [1, 1800 (sec)]. An exact time value of the extended wait time can be contained in the 'RRCConnectionReject' or 'RRCConnectionRelease' message. Once the extended wait time is contained, the UE reports to the upper layer (i.e., NAS layer), sets the timer value as the received 'extendedWaitTime', and starts the timer of the extended wait time. While the timer is running, the UE is not allowed to attempt an RRC connection request. The use of 'extendedWaitTime' is to prevent the UE (released or rejected) from attempting 'RRCConnectionRequest' for a longer period of time than the wait time.

The concept of the extended wait time is highly associated with the afore-mentioned M2M communications, delay tolerant accesses, and/or lower priority accesses. Namely, it is preferred that the extended wait time is applied to a UE, which has M2M, delay tolerant, and/or lower priority characteristics. For instance, if the UE is identified as an M2M (or MTC) devices, and/or a cause code in RRC messages (e.g., RRC connection request/release messages) is identified as 'delay tolerant' or 'lower priority', the extended wait time is applicable. Meanwhile, it is noted that even H2H devices (e.g., human UEs), as opposed to M2M devices, can have the delay tolerant or lower priority characteristics, when a certain connection or an application in the H2H devices has such characteristics.

The present description is related to extended access barring (EAB), which is applied to UEs supporting delay tolerant (e.g., MTC, M2M, lower priority) services. In other words, the present description is beneficial to a UE configured for EAB. Detailed features and requirements of EAB are disclosed in 3GPP TS 22.011 V11.0.0. The EAB which is applicable to delay tolerant services is corresponding to the afore-mentioned Access Class (AC) barring procedure which is applicable to conventional human to human (H2H) communication. The EAB can be performed together with or instead of the conventional AC barring.

Based on 3GPP standards, the following requirements are considered:

EAB is a mechanism for the operator(s) to control Mobile Originating (MO) access attempts from UEs that are configured for EAB in order to prevent overload of the access network and/or the core network.

In congestion situations, the operator can restrict access from UEs configured for EAB while permitting access from other UEs.

UEs configured for EAB are considered more tolerant to access restrictions than other UEs.

When an operator determines that it is appropriate to apply EAB, the network broadcasts necessary information to provide EAB control for UEs in a specific area.

Further, the following requirements are also applied:

The UE is configured for EAB by the Home PLMN (HPLMN).

EAB shall be applicable to all 3GPP Radio Access Technologies.

EAB shall be applicable regardless of whether the UE is in a Home or a Visited PLMN.

Relevant information to enable the UE to perform EAB should be provided to the UE. In this description, such information is referred to as 'EAB information'. The EAB information should include the following information:

The EAB information shall define whether EAB applies to UEs within one of the following categories: a) UEs that are configured for EAB; b) UEs that are configured for EAB and are neither in their HPLMN nor in a PLMN that is equivalent to it; c) UEs that are configured for EAB and are neither in the PLMN listed as most preferred PLMN of the country where the UE is roaming in the operator-defined PLMN selector list on the SIM/USIM, nor in their HPLMN nor in a PLMN that is equivalent to their HPLMN.

Further, the EAB information shall also include extended barring information for Access Classes 0-9. For instance, various information can be included in the EAB information to restrict access UEs with various Access Classes. For instance, bitmap information in which respective bits represent whether a certain Access Class is barred can be included in the EAB information. In particular, 10-bit information each representing ACs 0-9 together with at least two bits representing a category of the UE can be included in the EAB information. Alternatively, a probability factor and a barring timer for a certain Access Class can be included in the EAB information.

The UE configured for EAB shall use its allocated Access Class(es), as defined in sub-clause 4.2 of 3GPP TS 22.011 V11.0.0, when evaluating the EAB information that is broadcast by the network, in order to determine if its access to the network is barred.

When performing EAB, the following requirement also should be applied:

If the UE that is configured for EAB initiates an emergency call or is a member of an Access Class in the range 11-15 and according to clause 4.3.1 of 3GPP TS 22.011 V11.0.0 that Access Class is permitted by the network, then the UE shall ignore any EAB information that is broadcast by the network.

If the network is not broadcasting the EAB information, the UE shall be subject to access barring as described in clause 4.3.1 of 3GPP TS 22.011 V11.0.0.

If the EAB information that is broadcast by the network does not bar the UE, the UE shall be subject to access barring as described in clause 4.3.1 of 3GPP TS 22.011 V11.0.0.

In the case of multiple core networks sharing the same access network, the access network shall be able to apply the EAB for the different core networks individually.

It should be noted that the following agreements have been made for EAB information and operations related to EAB:

Somehow the UE knows whether at a certain radio resource control (RRC) connection establishment it needs to apply EAB or not.

Broadcast Control Channel (BCCH) broadcasts EAB information.

The EAB information on BCCH indicates which 'category' of UEs configured with EAB apply EAB.

UEs configured with EAB check their categories (i.e. category a, b, c) in order to decide whether or not to apply EAB.

If UE is establishing the RRC connection for emergency call, UE configured with EAB applies no EAB.

If UE has no special AC, UE configured with EAB applies EAB for non-emergency calls.

If the EAB information is not available on BCCH, UEs configured with EAB apply no EAB, but apply Rel-10 ACB.

It should be noted that various mechanisms for EAB information update and acquisition are proposed. In more detail, it has been agreed that BCCH broadcasts the EAB information, but new methods for EAB information update and acquisition, instead of conventional System Information Block (SIB) update and acquisition mechanisms, are proposed. The reasons why new method for EAB information update and acquisition should be required are:

1) In the conventional 3GPP LTE standards, modifications to most of SIBs are currently allowed only at a Modification Period (MP) boundary. Considering the power saving for UEs, generally it can be expected that the MP will be set to several seconds in the real systems. However, a large amount of MTC devices may access the network in a highly synchronized manner in some extreme scenarios, e.g., after a power outage. If EAB information update and acquisition are based on the traditional SIB update and acquisition mechanisms, it is difficult to adapt access control strategy fast to a sudden surge of accesses from MTC devices due to the long SIB modification period. Once overload of access network happens, the H2H UEs' access will be impacted and H2H UEs' experience will be degraded.

2) In the conventional 3GPP LTE standards, a UE verifies that the stored system information remains valid by either checking 'systemInfoValueTag' in SIB1 (SystemInformationBlockType1) or checking 'systemInfoModification' indication in paging messages. Once a UE receives notification of system information change, it considers all SIBs to be invalid. Hence, if EAB information update and acquisition are based on the traditional SIB update and acquisition mechanisms, it causes the UEs not configured for EAB to re-acquire the system information unnecessarily. UE operations may be restricted until UE has re-acquired the most essential system information, especially in RRC_CONNECTED state.

It should be noted that, as recited in 3GPP TS 36.331, 'systemInfoValueTag' in SIB1 is incremented by a certain number (e.g., '1') when system information is changed so that a UE may know a version number of system information, thereby determining whether its recently-received system information is valid (up-to-date) or not. Further, 'systemInfoModification' in the paging indicates change of system information in a subsequent MP.

Considering the foregoing issues, there have been a number of proposals suggesting that: 1) a new SIB (or EAB SIB) and a new method to update and acquire the EAB SIB instead of conventional SIB update and acquisition mechanisms should be considered; and 2) E-UTRAN shall not update 'systemInfoValueTag' and shall not include the 'systemInfoModification' within paging messages in case of EAB information change. In addition, a number of alternatives on how UEs acquire the latest EAB information are proposed.

Based on the above suggestions, a number of alternatives are proposed. The proposed alternatives are:

Alternative 1: ETWS-like solution for EAB;

Alternative 2: UEs always acquire the latest EAB information before random access;

Alternative 3: EAB change notification in random access response (RAR) message;

Alternative 4: UEs try to acquire EAB change notification in RAR message before random access.

Alternative 1 proposes that the network notifies the UEs configured for EAB of EAB information change through paging messages, such as ETWS (Earthquake and Tsunami Warning service) notification, and when a UE obtains the EAB change notification through paging the UE shall immediately acquire the EAB SIB to get the latest EAB information without the restriction of the MP boundary. Further, Alternative 2 proposes that network modifies the EAB information without notification, and when a UE configured for EAB wants to initiate a Mobile Originating (MO) access attempt the UE shall acquire the EAB SIB to get the latest EAB information before performing random access procedure. However, Alternatives 1 and 2 have considerable drawbacks such as excessively increasing the amount of paging message and/or the HE power consumption due to unnecessary SIB acquisition for EAB.

Based on Alternative 3, the network modifies the EAB information without active notification. When a UE configured for EAB wants to initiate a MO access attempt, the UE always assumes the EAB is disabled and sends a preamble for random access directly. When an eNB receives the preamble, the eNB replies a RAR (random access response or MSG#2) message to the UE and uses a reserved bit in the RAR message to indicate whether EAB is enabled or not. If EAB is disabled, the UE performs random access procedure continuously. If EAB is enabled, the UE interrupts current random access procedure and acquires the latest EAB information before resuming the MO access attempt.

Based on Alternative 4, the network also modifies the EAB information without active notification. When a UE configured for EAB wants to initiate a MO access attempt, the UE first tries to receive a RAR message (which is replied to other UEs) to determine whether EAB is enabled or not (according to the EAB change notification in RAR message). If EAB is disabled, the UE performs random access procedure directly. If EAB is enabled, the UE acquires the latest EAB information before performing the first preamble transmission.

However, Alternatives 3 and 4 have a number of problems as follows:

Problem 1: It is not clear that EAB change notification in RAR indicates a specific version of EAB information which has been changed.

Problem 2: If eNB does not receive any RA preamble, RAR may not be sent. Hence, delay of random access for UEs configured for EAB may be increased in the less loaded case because they should wait receiving at least one RA response before sending an initial random access preamble.

Problem 3: For MO access, there may be two cases (i.e., Pull based Mobile Originated Access and Non-Pull based MO access). Pull based MO access is controlled by eNB's downlink control signaling such as paging. If the UE obtains EAB related information through downlink control signaling for pull based MO access, UEs does not need to receive RAR including EAB change notification before sending the initial random access preamble.

Further, in case where EAB change notification is received via a broadcasting channel such as BCCH, which transmits EAB information, there occurs a problem (i.e., Problem 4) in which RAN overload control cannot be dynamically controlled. This is because while RAN overload can be controlled dynamically, but EAB information on BCCH is hard to be applied/changed for dynamic RAN overload control, since its transmission/modification period is too long.

Therefore, the present description introduces a number of proposals (i.e., the following Proposals 1-2). It should be noted that the proposals of the present description are conceived based on the following points:

UEs in idle state or in detached state may store SIB information and check 'systemInfoValueTag' by receiving SIB1 to verify its stored SIB is up-to-date before attempting random access.

Even though EAB information changed, 'systemInfoValueTag' in SIB1 is not required to be updated, since updating the 'systemInfoValueTag' in SIB1 causes non-MTC devices (which is not configured with EAB) to unnecessarily decode SIB information.

EAB information is not UE specific but cell specific. Each UE may store different version of SIB information (i.e., different 'systemInfoValueTag') depending on its unavailable time interval (e.g., DRX interval, or detached period), which means that UEs may store different EAB information each other.

Hereinafter, Proposal 1 is explained. In Proposal 1, 'eabInfoValueTag' is newly defined in SIB1. The newly defined 'eabInfoValueTag' indicates a version of EAB information by incrementing its tag value whenever the EAB information is updated. Since the newly defined tag is separated from the conventional 'systemInfoValueTag', updating the 'eabInfoValueTag' does not affect the operation of non-MTC devices (or any UE not configured with EAB).

Based on Proposal 1, before attempting random access, a UE configured with EAB checks whether its stored EAB information is up-to-date by comparing received the 'eabInfoValueTag' with previously-stored 'eabInfoValueTag'. If the stored EAB information is up-to-date, the UE uses the stored information for ACB check (i.e., checking whether the UE is barred or not based on the UE's access class and the received EAB information) without receiving an EAB SIB, which is SIB including EAB information. If the EAB information is not up-to-date (i.e., the value of eabInfoValueTag received is not same as that of the stored one), the UE should receive SIB including EAB information before EAB check.

Various modification of Proposal 1 is possible. For instance, instead of the 'eabInfoValueTag', 'mtcInfoValueTag' can be defined, which indicates a version of MTC related system information. Examples of the MTC related system information are not limited to EAB related information. Rather, the MTC related system information includes 'eabInfoValueTag', MTC random access preamble index information, MTC random access channel allocation information, MTC random access backoff information (which is longer than backoff for H2H communications).

Based on Proposal 1, the 'eabInfoValueTag' or 'mtcInfoValueTag' may be defined in high frequency of SIB (e.g., SIB1) and low frequency of SIB (e.g., SIB X including EAB information itself). In other words, Proposal 1 proposes to transmit EAB information itself less frequently than its change-notification. Alternatively, the 'eabInfoValueTag' or 'mtcInfoValueTag' may be defined in RAR rather than 'SIB' and less frequency of SIB (e.g., SIB X including EAB information itself).

Proposal 1 clarifies operations related to EAB change notification and solves the aforementioned Problem 1.

Proposal 1 can be modified to further solve the aforementioned Problem 4. To solve Problem 4, a RAR message may dynamically include EAB information which is different from EAB information defined in SIB. Since information transmitted via SIB is delivered to a UE based on pre-defined periodicity, which is too long to follow dynamic RAN overload control, the present description proposes to use a RAR message for delivery of EAB information. The UE performs EAB based on the latest information include in the RAR or SIB. In particular, after receiving the RAR message including EAB information, UEs perform the EAB check procedure.

Hereinafter, Proposal 2 is explained. Proposal 2 is proposed to solve the aforementioned Problem 1.

As discussed above, a number of methods (e.g., aforementioned Alternatives 3-4) using 'EAB change notification', which indicates whether EAB information has been changed are proposed. However, Proposal 2 proposes to newly defined 'eabApplication' information indicating whether EAB is applied or not, rather than defining the 'EAB change notification'. The 'eabApplication' information can be 1-bit information.

Based on Proposal 2, if the 'eabApplication' information is off (e.g., set to '0'), EAB is not applied. Therefore, EAB does not bar any UE, and the UE shall be subject to access barring as described in clause 4.3.1 of 3GPP TS 22.011, Service accessibility, v11.0.0. On the other hand, if the 'eabApplication' information is on (e.g., set to '1'), EAB is applied. Therefore, the UE configured with EAB should receive EAB information via EAB-related SIB for EAB check.

In particular, when the 'eabApplication' information is set to 'on', it indicates that EAB is applied and at least one of ACs 0-9 is barred. Therefore, when the 'eabApplication' information is set to on (or when EAB is applied), EAB check procedure, which determines if the UE is barred, is required. In order to determine whether a specific AC is barred, the UE receives updated EAB information, which can include bitmap information indicating at least one AC which is barred due to EAB. As discussed above, since ACs 0-9 are subject to EAB, the bitmap information may be 10-bit information. The 'eabApplication' information may be defined in RAR and/or SIB1 for the UE to check whether EAB is applied without long delay.

Figure 4:
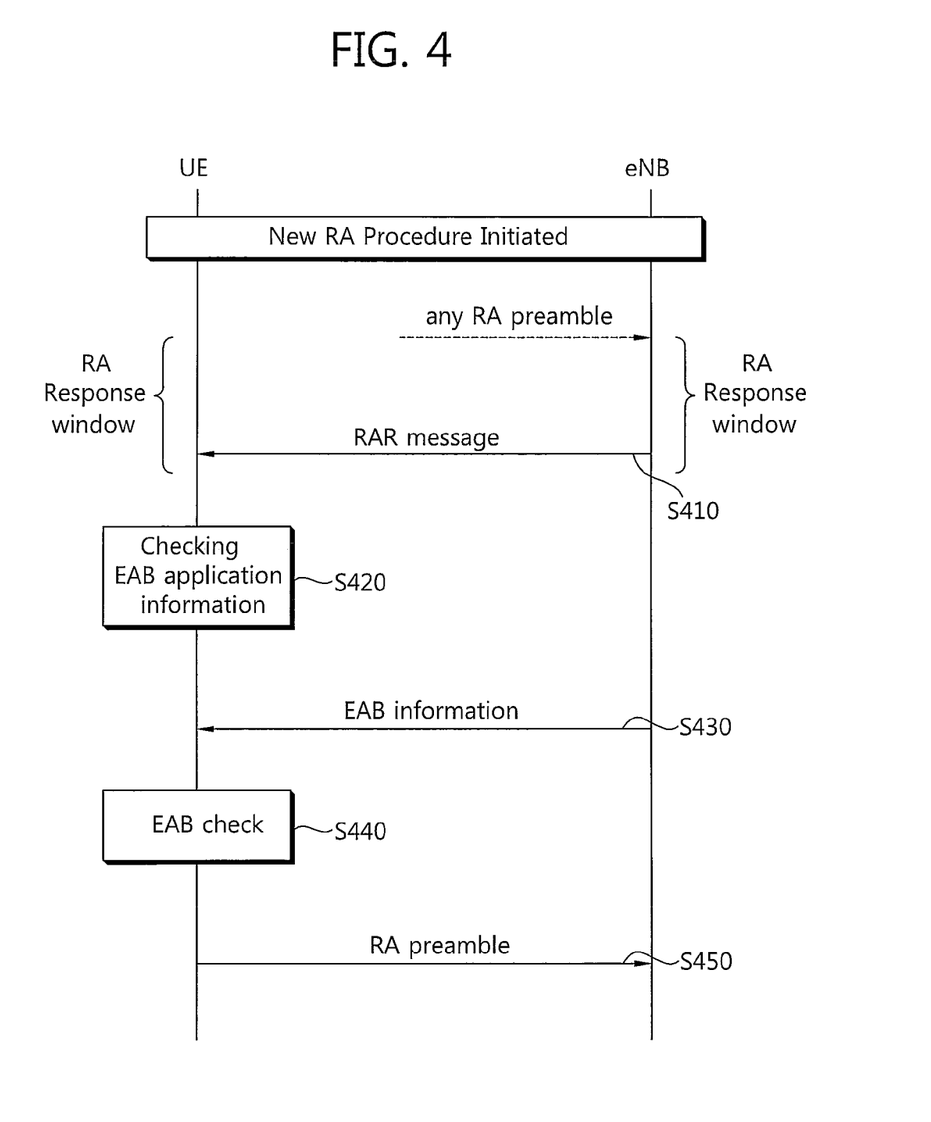
FIG. 4 depicts random access procedure proposed by the present description.

Proposal 2 can be modified in a various way. FIG. 4 depicts random access procedure proposed by the present description. FIG. 4 is a method of receiving data associated with extended access barring (EAB) which is performed by a UE configured with EAB. Namely, FIG. 4 is applicable to a UE with MTC, M2M, delay tolerant, or low priority features.

As depicted in FIG. 4, the eNB should transmit a RAR within a RA response window if the UE receives any random access preamble, so the RA response window should be set as the minimum time duration a UE should check the existence of RA response (S410). Since the minimum time duration is set, the Problem 2 (i.e., problems of excessive delay) can be cured.

From a UE perspective, the UE configured with EAB should wait the duration of the RA response window to receive the RAR before skipping initial EAB check. In other words, when the UE initiates a new RA procedure, the UE determines whether a RAR is received during the RA response window. As discussed above, the UE should wait the duration of RA response window before skipping the initial EAB check, and thus such determination of UE is performed before transmitting an initial RA preamble transmission. In the meantime, information on RA response window is known to the UE by means of conventional technologies such as system information.

If the RA response window passed and no RAR is received, the UE skips EAB checking in case of initial RA preamble transmission. In other words, if the RAR is not received during the RA response window, the UE transmits a RA preamble and thereafter performs a subsequent RA procedure (not depicted in FIG. 4).

If the RAR is received during the RA response window, determining UE whether the 'eabApplication' information included in the RAR indicates that the EAB is applied (S420). If the 'eabApplication' information indicates that the EAB is not applied, the UE transmits a RA preamble and thereafter performs a subsequent RA procedure (not depicted in FIG. 4).

In case that the EAB application information indicates that the EAB is applied, the UE further receives EAB information from the eNB (S430). After that, the UE perform operations according to the received EAB information. Namely, wherein a subsequent random access procedure is performed based on the EAB information. In particular, the UE performs EAB check based on the received EAB information (S440). As a result of the EAB check, if the UE is not barred, the UE thereafter transmits a RA preamble (S450).

Figure 5:
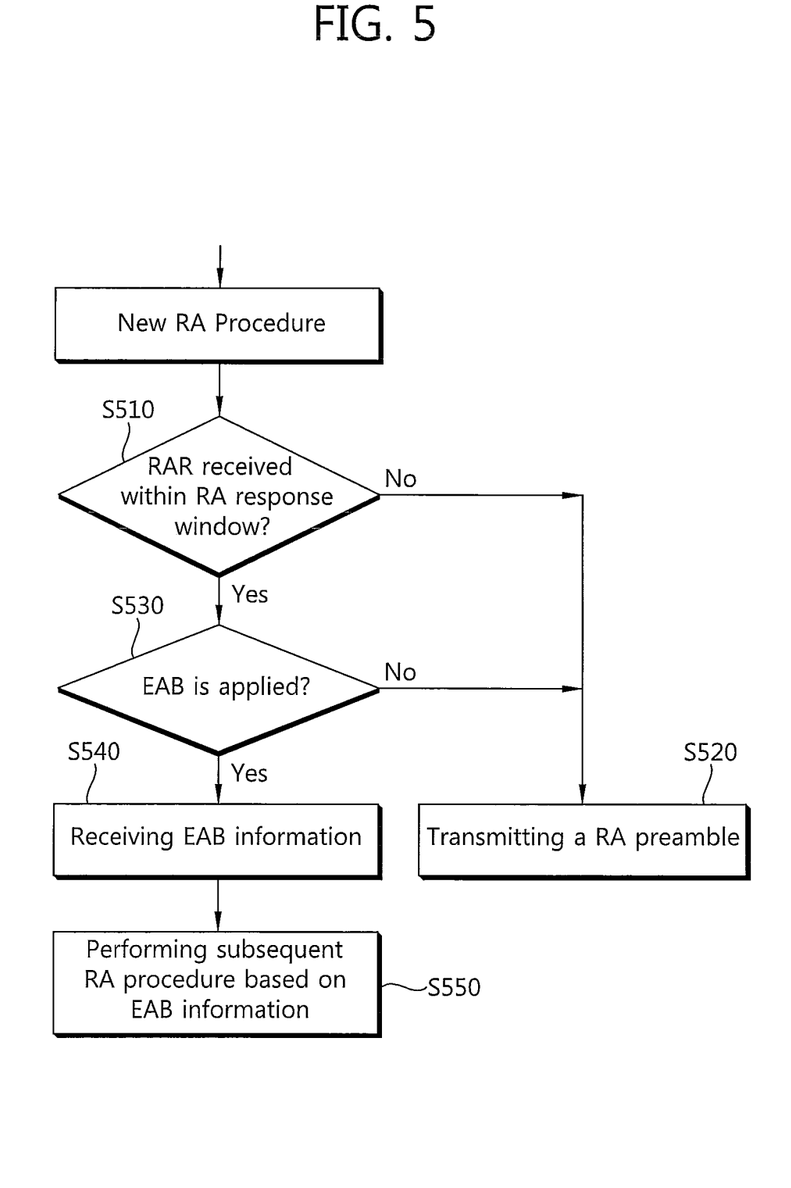
FIG. 5 depicts random access procedure proposed by the present description.

FIG. 5 also depicts random access procedure proposed by the present description. As discussed in FIG. 4, the UE can initiate a RA procedure by determining whether a RAR is received, before transmitting a RA preamble from the UE, during a RA response window (S510).

If the RAR is not received during the RA response window, the UE transmits a RA preamble to the eNB (S520).

If the RAR is received during the RA response window, determining UE whether the 'eabApplication' information included in the RAR indicates that the EAB is applied (S530). If the 'eabApplication' does not indicate that the EAB is applied, transmitting a RA preamble to the BS (S520).

If the 'eabApplication' indicates that the EAB is applied, the UE receives EAB information to perform a subsequent random access procedure (S540-S550). For instance, the UE is not barred as a result of the EAB check, the UE may transmit a RA preamble.

Figure 6:
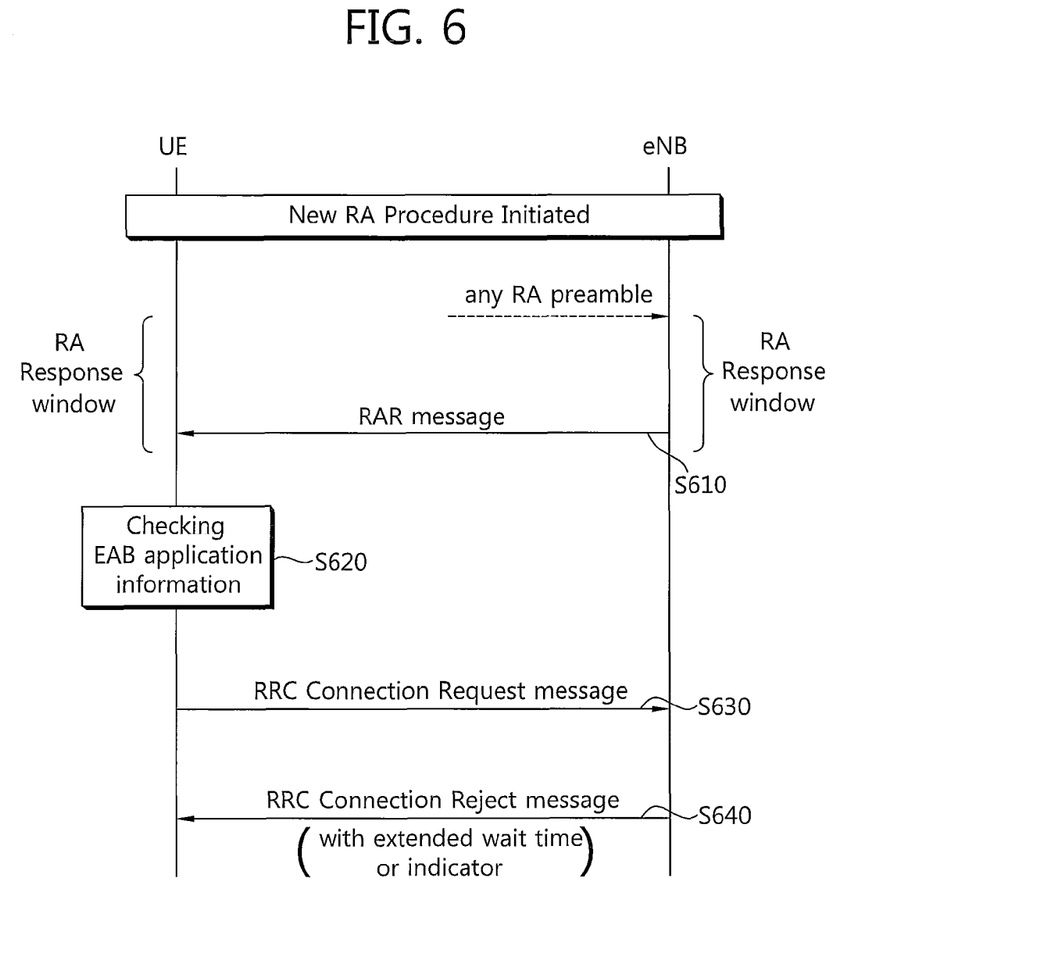
FIG. 6 depicts another example of the present description.

It should be noted that modification of FIGS. 4-5 is possible. FIG. 6 depicts another example of the present description. In FIGS. 4-5, when the 'eabApplication' information included in the RAR indicates that the EAB is applied, the UE further receives the EAB information. However, in the same situation, the UE may transmit an RRC connection request, instead of receiving the EAB information (S630). This is because, such RRC connection request from the UE can be anyway rejected by an RRC message with the above-explained 'extend wait time' (S640). Thus, the UE can simply transmit the RRC connection request rather than receiving the EAB information and perform the EAB check, as shown in FIG. 6 Alternatively, the UE may receive an indicator that the UE's RRC connection request is rejected, rather than receiving the 'extend wait time' (S640).

Another modification is still possible. For instance, downlink control signaling for pull base MO access (e.g., downlink paging signaling) contains the 'eabApplication' indication, thereby solving Problem 3. In more detail, after the UE receiving the 'eabApplication' in downlink control signaling for pull base MO access, the UE performs a subsequent RA procedure based on the 'eabApplication' indication.

Figure 7:
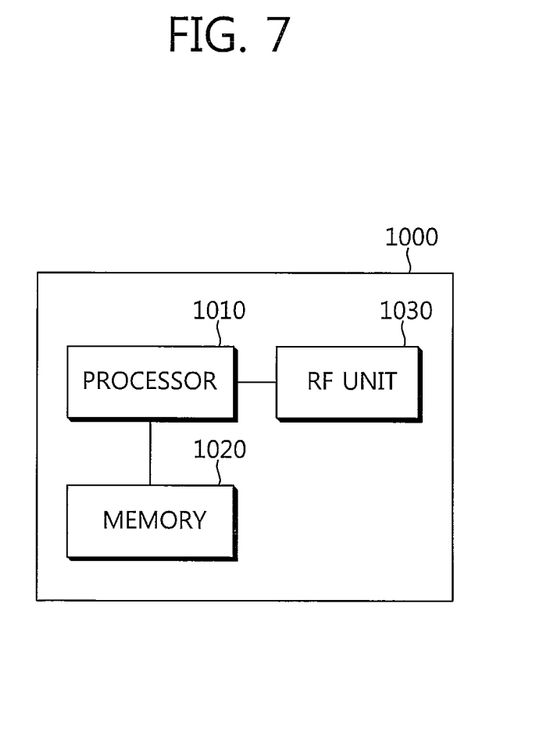
FIG. 7 is a block diagram showing a wireless apparatus to implement technical features of this description.

FIG. 7 is a block diagram showing a wireless apparatus to implement technical features of this description. This may be a part of a UE, an eNodeB/HeNodeB/HNodeB, or a core network (CN) entity. The wireless apparatus 1000 may include a processor 1010, a memory 1020 and a radio frequency (RF) unit 1030.

The processor 1010 may be configured to implement proposed functions, to procedures and/or methods described in this description. Layers of the radio interface protocol may be implemented in the processor 1010. The processor 1010 may handle a procedure explained above. The memory 1020 is operatively coupled with the processor 1010, and the RF unit 1030 is operatively coupled with the processor 1010.

The processor 1010 may include application-specific integrated circuit (ASIC), other chipset, logic circuit and/or data processing device. The memory 1020 may include read-only memory (ROM), random access memory (RAM), flash memory, memory card, storage medium and/or other storage device. The RF unit 1030 may include baseband circuitry to process radio frequency signals. When the embodiments are implemented in software, the techniques described herein can be implemented with modules (e.g., procedures, functions, and so on) that perform the functions described herein. The modules can be stored in memory 1020 and executed by processor 1010. The memory 1020 can be implemented within the processor 1010 or external to the processor 1010 in which case those can be communicatively coupled to the processor 1010 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method of receiving data associated with extended access barring (EAB) in a wireless communication system, the method performed by a user equipment (UE) with delay tolerant access and comprising:
  determining whether a random access response is received from a base station (BS) during a random access response window,
  wherein the random access response window is set as a minimum time duration for the UE to check an existence of the random access response,
  wherein the minimum time duration is indicated by information included in system information, and
  wherein the random access response is received from the BS prior to a transmission of a random access preamble by the UE;
  if it is determined that the random access response is received during the random access response window, checking whether EAB application information included in the random access response indicates that the EAB is applied;
  if it is checked that the EAB application information indicates that the EAB is applied, receiving EAB information from the BS to perform an EAB check,
  wherein the EAB information is received via a system information block type 2 (SIB2) transmitted through a Broadcast Control Channel (BCCH),
  wherein the EAB information includes an EAB probability factor and a barring timer for each access class, and
  wherein the EAB checking is performed according to the EAB probability factor and the barring timer included in the EAB information; and
  if the UE is not barred by the EAB checking, transmitting the random access preamble to the BS.

2. The method of claim 1, wherein the EAB application information is 1-bit information indicating whether at least one of access classes 0 to 9 is barred, and wherein the 1-bit information is set on when the at least one access class is barred.

3. The method of claim 1, wherein the EAB information includes bitmap information indicating whether a certain access class is barred or not.

4. The method of claim 3, wherein the bitmap information consists of 10 bits corresponding to access classes 0 to 10.

5. The method of claim 1, wherein the UE is a machine type communication (MTC) device.

* * * * *